Aug. 5, 1930.                S. BERNARD                1,772,383
                              HOG FEEDER
                           Filed July 22, 1927
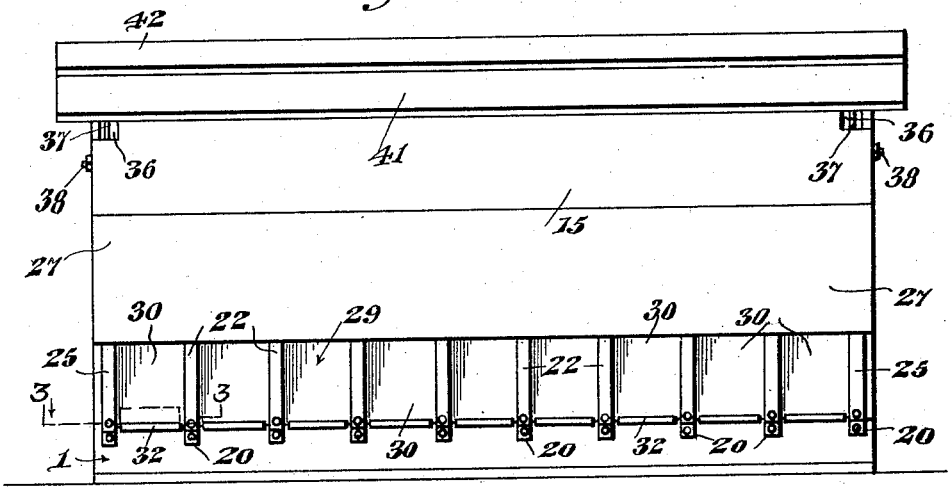
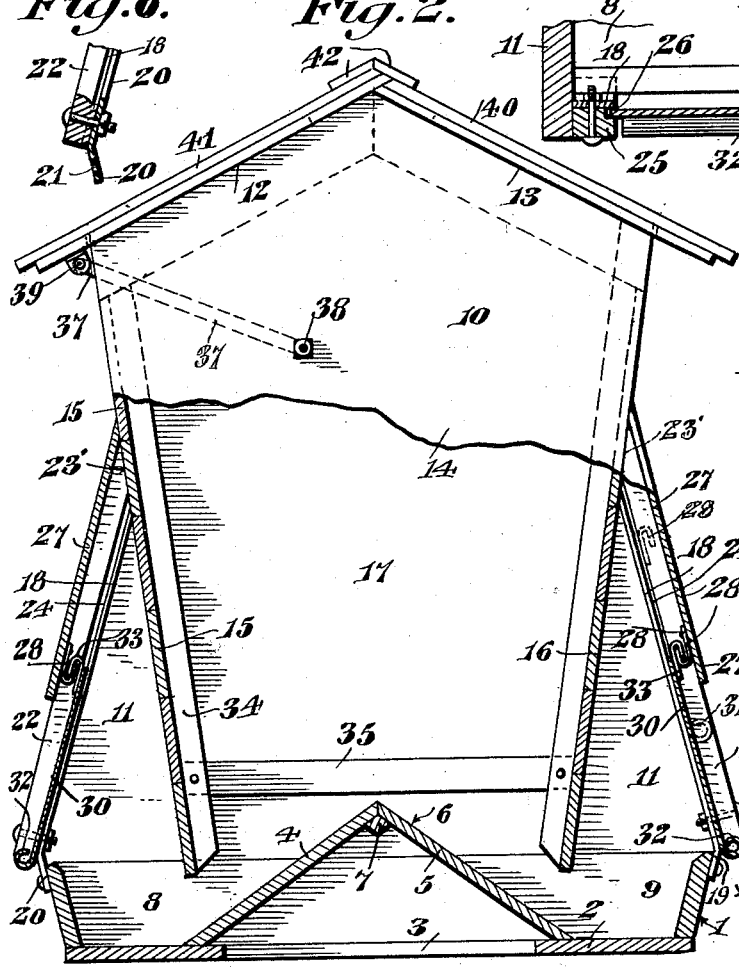
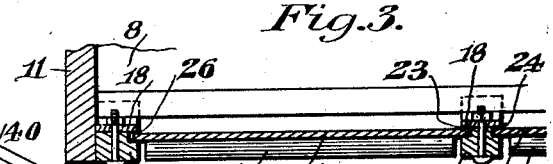
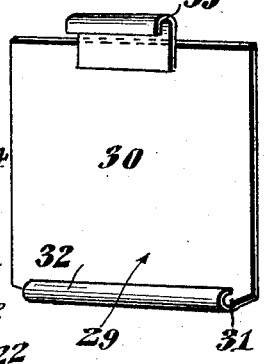
INVENTOR.
S. Bernard,
By Geo. F. Kimmel
ATTORNEY.

Patented Aug. 5, 1930

1,772,383

UNITED STATES PATENT OFFICE

STEPHEN BERNARD, OF HOLTON, KANSAS

HOG FEEDER

Application filed July 22, 1927. Serial No. 207,714.

This invention relates to a hog feeder, and has for its object to provide, in a manner as hereinafter set forth, a feeder of such class including a pair of oppositely disposed feed troughs, a plurality of spaced feed openings associated with each trough and with each opening normally closed by a slide or gate shiftable upwardly by a hog so access can be had to the feed in the troughs and movable by gravity to closure position after the hog has left the trough.

Further objects of the invention are to provide, in a manner as hereinafter set forth, a hog feeder which is comparatively simple in its construction and arrangement, strong, durable, thoroughly efficient in its use, conveniently supplied with feed, compact, readily assembled, and comparatively inexpensive to manufacture.

With the foregoing and other objects in view the invention consists of the novel construction, combination and arrangement of parts, as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is an elevation, of a hog feeder in accordance with this invention, looking towards one side thereof.

Figure 2 is a cross sectional view thereof.

Figure 3 is a section on line 3—3 Figure 1.

Figure 4 is a perspective view of one of the gates or slides.

Figure 5 is a perspective view of a stop member for a gate or slide.

Figure 6 is a fragmentary view, in section, illustrating the lower end of one of the guiding means for a gate or slide.

The hog feeder includes a base 1 of pan like form and of rectangular contour. The base 1 is of substantial height and has its bottom 2 formed with a central opening 3 which extends longitudinally of said bottom. Mounted on the upper face of the base 1, positioned over the opening 3 and extending from one end wall to the other end wall of said base 1 is an inverted V-shaped element of greater height than the base 1 and which provides a pair of oppositely extending, inclined slideways or deflectors 4, 5. The inverted V-shaped element is indicated generally at 6 and is formed of a pair of oppositely disposed members abutting at their tops. The element 6 is mounted on and secured to a support 7 which is positioned above the base 1 and connected to the opposed end walls of a hopper section to be presently referred to. The element 6 in connection with the base 1 forms a pair of oppositely disposed troughs 8, 9 and said element 6 provides means for directing the feed, from the hopper section to be presently referred to, into the troughs 8, 9.

The feeder includes a pair of end walls formed of oppositely extending tapered parts 10, 11, and with the latter of greater height than the former. The part 11 is of greater width than the part 10 and the latter has its top edge oppositely inclined as indicated at 12, 13. The bottom edge of the part 11 is seated on an end wall of the base 1.

Each of the end walls which are seated on the end walls of the base 1 is indicated generally at 14. Arranged between, as well as being secured to the end walls 14 is a pair of wall forming members 15, 16 disposed at opposite inclinations and inclining away from each other from their lower to their upper ends. The members 15, 16 at their upper ends are flush with the upper ends of the part 10 of the end walls 14. The members 15, 16 are flush with the end edges of the part 10 of the end walls 14 but are positioned a substantial distance inwardly of the ends of the part 11 of the end walls 14. The part 10 of the end walls 14, as well as the portions of the part 11 arranged between the members 15, 16, in connection with the members 15, 16 provide a feed hopper section 17 and which discharges on the element 6. The latter extends up into the hopper section, but is spaced from the lower ends of the wall forming members 15, 16. The element 6 abuts against the inner face, at the lower end of the part 11 of each of the end walls.

Positioned against the outer faces of the wall forming members 15, 16 intermediate the upper and lower ends of said members, is a series of spaced, flat supporting bars 18 and each of which has its upper end abutting against one of the members 15 or 16 and its lower end formed with an inturned part 19 which is secured to the outer face of a side wall of the base 1. The holdfast device for securing the inturned part 19 is indicated at 20. The inturned part 19 is formed with an opening 21 for the passage of the holdfast device 20. The bars 18 are disposed at a downward and outward inclination with respect to the wall forming members 15, 16.

Secured against the outer face of each of the bars 18, is a combined guide forming and retaining member 22 in the form of a bar of the same width as the bars 18 and which has its upper end abutting against the member 15 or 16 and further with the upper end thereof beveled as indicated at 23'. The lower ends of the members 22 are positioned above the inturned part 19 of the bars 18. The intermediate members 22 are of T-shaped cross section and the outer of said members 22 is rabbeted on its inner side and the construction of the members in the manner as stated is illustrated in Figure 3. The inner members 22 in connection with the inner bars 18 provide a pair of guide grooves 23, 24. The rabbet formed on the inner side of each of the outer members 22, is indicated at 25 and which in connection with an outer bar 18 provides a guide groove 26. The guide grooves in the members 22 oppose each other. The members 22 are disposed at the same inclination as the bars 18.

Secured against the upper portion of each set of members 22 is a closure board or plate 27 of less width than the length of the members 22. Each closure board or plate 27 has its top abut the outer face of a member 15 or 16. Each set of members 22, in connection with the supporting bars therefor, and a closure board or plate provide a series of feed openings which are normally closed by gates or slides to be presently referred to. Each closure board or plate extends from one end wall 14 to the other end wall 14 and is disposed at an outward inclination and has secured to its inner face, in proximity to its lower end, a series of spaced stop members 28 of hook shaped form and each of which is positioned between a pair of members 22 intermediate the ends of these latter.

Slidably mounted in each pair of opposed guide grooves is a closure gate or slide 29 for each feed opening and which is shifted upwardly by the hog so that access can be had to the feed in a trough and after the hog leaves the trough the gate or slide moves to closure position by gravity. The gates or slides 29 are disposed at the same inclination as the bars 18 and members 22. Each gate or slide consists of a rectangular body portion 30 of a length to completely close a feed opening and of a width greater than the width of the opening and further of a width to extend into a pair of opposed guide grooves. The lower end of the body portion 30 is provided with a right angularly disposed outwardly extending flange 31 which merges into a rounded outer terminal 32. The flange 31 provides means engaged by the hog for the purpose of shifting upwardly the gate or closure 29. Secured to the outer face of the body portion 30, at the top thereof, is a hoop shaped latching member 33 which coacts with the stop member 28 for arresting the downward movement of the gate 29 when moved to closure position by gravity and for suspending the gate.

Connecting bars or posts 34 are arranged between the end walls 14 and the members 15, 16. The said bars or posts 34 are positioned against the inner face of the end walls 14 at the ends of the members 15, 16. Connecting bars 35 are provided between the lower ends of the members 15, 16 and are mortised in the posts or bars 34.

The members 15, 16 at each end thereof are cut away to provide an opening 36 and extending through each of said openings is a link 37, having its inner end pivotally connected as at 38 to an end wall 14, at the part 10 thereof and to one side of the vertical median of said part 10. The outer end of each link 37, is pivotally connected as at 39 to a swinging roof section. The hopper section, at its top, is provided with a roof consisting of a stationary section 40 and a shiftable or swinging section 41. The section 41 when in closed position abuts against the upper edge of the section 40 and said section 41 carries an inverted V-shaped strip 42 which overlaps the section 40 when the section 41 is in closure position to provide a water tight joint between the upper ends of said sections. The sections 40, 41 are disposed at an opposite inclination and seated on the inclined parts of the top edges of the end walls 14. The sections 40, 41 project beyond the members 15, 16 at the tops thereof. The providing of the roof with a shiftable or swinging section forms the upper end of the hopper section with a supply opening for the feed to the hopper section.

The feeder is normally closed, and access cannot be had to the feed in the troughs 8 or 9, until the hog has shifted upwardly a gate 29 and which rests on the hog while he is feeding, therefore when the hog moves away from the troughs the gate 29 will move by gravity to closure position.

It is thought the many advantages of a hog feeder, in accordance with this invention, can be readily understood, and although the preferred embodiment of the invention is as illustrated and described, yet it is to be understood that changes in the details of construction can be had which will fall within the scope of the invention as claimed.

What I claim is:

1. A hog feeding device comprising a feed hopper, a feed trough arranged thereunder and projecting laterally therefrom, said hopper having an open bottom spaced from the bottom of the trough to provide for an automatic flow of feed from the hopper to the trough, spaced, guide forming members extending at a downward inclination from a side of the hopper to the outer side of the trough adjacent the upper edge of the latter, and closure members slidably supported by said guide forming members and disposed when in closure position with their lower edges adjacent the upper edge of the trough at the outer side of said upper edge.

2. A hog feeding device comprising a feed hopper, a feed trough arranged thereunder and projecting laterally therefrom, said hopper having an open bottom spaced from the bottom of the trough to provide for an automatic flow of feed from the hopper to the trough, spaced, guide forming members extending at a downward inclination from a side of the hopper to the outer side of the trough adjacent the upper edge of the latter, and closure members slidably supported by said guide forming members and disposed when in closure position with their lower edges adjacent the upper edge of the trough at the outer side of said upper edge, said closure members being formed at their lower edges with outwardly projecting portions for engagement by the snout of a hog whereby the closure members may be shifted to open position to permit access to the feed within the trough, said closure members resting on the head of the hog while the latter is feeding and operating by gravity to normal closure position upon the withdrawal of the head of the hog from the trough.

In testimony whereof, I affix my signature hereto.

STEPHEN BERNARD.